Nov. 19, 1968 R. E. RISELY 3,412,335
AUTOMATIC FREQUENCY CONTROL CIRCUIT
Filed Sept. 30, 1965

Inventor
RICHARD E. RISELY
BY
Mueller, Aichele & Rauner
ATTYS.

United States Patent Office 3,412,335

Patented Nov. 19, 1968

3,412,335

AUTOMATIC FREQUENCY CONTROL CIRCUIT

Richard E. Risely, Riverside, Calif., assignor to Motorola, Inc., Franklin Park, Ill., a corporation of Illinois Filed Sept. 30, 1965, Ser. No. 491,517
14 Claims. (Cl. 325—420)

ABSTRACT OF THE DISCLOSURE

A stable transistorized AFC circuit for regulating the repeller voltage of a local oscillator klystron tube within a DC high voltage range. The emitter electrodes of a complementary pair of transistors are both directly coupled to the repeller while one of the collector electrodes is connected to a first source of DC voltage higher than the DC range, and the other collector electrode is connected to a second source of DC voltage lower than the DC range such that the arithmetic average of the voltages of said first and second sources, which appears at the emitter electrode junction, is within the DC range. The base electrodes of the transistors are coupled respectively to two tuned circuits which are in turn coupled to the IF output of the receiver to complete the control loop. The tuned circuits are tuned respectively to frequencies above and below the desired IF frequency to thereby provide voltage stepup.

Figures 1, 2:
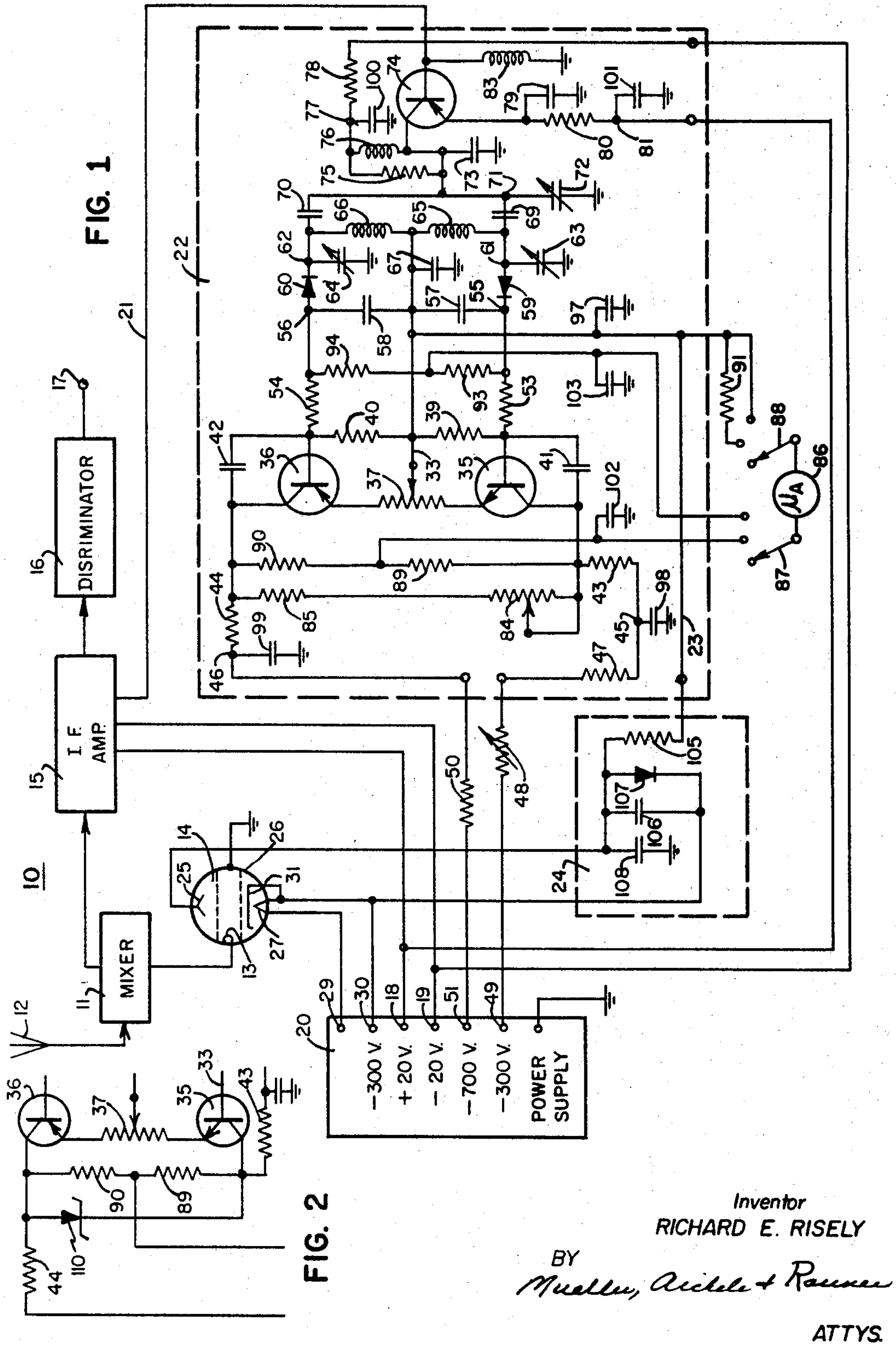

The circuit of this invention has other applications but was specifically designed for use in a superheterodyne microwave receiver wherein an IF signal is developed by applying an input signal and a local oscillator signal to a mixer, preferably a crystal diode, with the local oscillator comprising a klystron tube having a repeller electrode. The DC voltage of the repeller electrode has a controlling effect on the frequency of the local oscillator and to maintain the frequency of the IF signal at a fixed value, automatic frequency control circuits have heretofore been provided in which the voltage of the repeller electrode is controlled through a DC amplifier from a signal developed by a frequency discriminator circuit coupled to the output of an IF amplifier.

With such circuits, if the frequency of the local oscillator shifts due to temperature or power supply variations, the frequency at the output of the IF amplifier shifts a corresponding amount, and the discriminator circuit detects the frequency error to develop a DC voltage having an amplitude and polarity corresponding to the magnitude and direction of the frequency error. The DC voltage is amplified and applied to the repeller electrode to return the klystron to the proper frequency.

It is found that with the usual discriminator slope repeller modulation sensitivity, the DC amplifier must have a gain of several hundred and it must be stable and insensitive to temperature or power supply variations. Otherwise, it may drift to saturation causing the automatic frequency control circuit to lose control. Such high DC gain and low drift requirements make the design of the circuit difficult and expensive, and especially where the circuit is transistorized.

It is also found that another problem arises because the output of the DC amplifier, particularly in the transistorized circuits, is centered about a low DC voltage, usually zero with respect to reference ground, while the klystron repeller must be operated at a relatively high DC voltage, usually from four hundred to one thousand volts negative. In one type of prior circuit, the repeller has been connected to the adjustably movable contact of a potentiometer which is connected between an output terminal of the DC amplifier of the automatic frequency control circuit and a high negative voltage. This circuit has the disadvantage of applying only a fraction of the amplifier output to the repeller, thereby increasing of the required amplifier output swing and making it necessary to use high voltage transistors and high power supply voltages. It also necessitates a high gain in the DC amplifier which aggravates its stability problem.

In another type of prior circuit, a string or Zener diodes is connected between the repeller and the output of the DC amplifier of the automatic frequency control circuit, the repeller being also connected through a coupling resistor to a highly negative power supply terminal. This type of circuit is expensive and it is found that the voltage across the Zener diodes shifts with temperature variations.

This invention was evolved with the general object of overcoming the disadvantages of prior circuits, and of providing a circuit which is comparatively simple and inexpensive in construction and operation while obtaining highly stable, reliable and efficient operation.

According to this invention, a control electrode such as the repeller of a klystron is directly coupled to the output of DC amplifier means having an input connected to the output of a discriminator circuit, with capacitance means being provided for applying a high frequency signal to the input of the discriminator circuit, and with power supply means being provided having terminals connected to the DC amplifier means and being operated at potentials on opposite sides of the DC range of operation of the control electrode. With this arrangement, the coupling circuits of prior automatic frequency control circuits are eliminated, to avoid the above-noted disadvantages thereof.

In addition, it is possible to apply the high frequency signal to the discriminator circuit at a relatively high level, so that the required gain of the DC amplifier means is limited, to minimize the stability problems discussed above. According to a specific feature of the invention, a high frequency amplifier stage is provided between the IF amplifier and the input of the discriminator circuit, a separate discriminator or demodulator circuit being coupled to the IF amplifier for reproducing the intelligence of the received signal.

According to another specific feature of this invention, a transistor amplifier stage is used for supplying the high frequency signal to the input of the discriminator, and capacitance means are provided between the transistor amplifier stage and the input of the discriminator with such capacitance means having a relatively low value to protect the transistor amplifier stage against voltage transients developed in the discriminator circuit.

According to another specific feature of the invention, the coupling capacitance means form part of a series resonant circuit in a manner such as to develop a voltage stepup without necessitating a transformer.

According to a further important feature of the invention, complementary DC amplifier means are provided, preferably comprising a pair of transistors of opposite types, wherein the emitters are directly coupled together to the control electrode or repeller, with the base electrodes of the transistors being directly coupled to output terminals of the discriminator circuit. The collectors may be coupled to the power supply terminals operated at potentials above and below the DC range of operation of the control electrode. This arrangement provides highly stable and reliable operation.

According to another specific feature of the invention, the outputs of two diodes of the discriminator circuit are summed in the complementary amplifier, in a manner such as to eliminate losses due to resistive summing networks.

Another advantage of the complementary amplifier is that it provides a high input impedance which reduces loading of the discriminator. A further advantage is that the effects of leakage currents cancel so as to obtain a high degree of stability irrespective of temperature changes and the like.

Another feature of the invention is in the provision of means for limiting the voltage applied to the complementary amplifier. In the one form of the invention, resistance means are connected in parallel relation between the power supply and the complementary amplifier, such resistance means being preferably adjustable. In another form of the invention, a Zener diode is used for limiting the voltage applied to the transistors of the complementary amplifier, to protect the transistors against damage.

This invention contemplates other and more specific objects, features and advantages which will become more fully apparent from the following detailed description taken in conjunction with the accompanying drawings which illustrate preferred embodiments and in which:

FIGURE 1 is a schematic circuit diagram illustrating a microwave receiver having an automatic frequency control system constructed according to the invention; and FIGURE 2 is a circuit diagram showing a modification of a portion of the circuit of the automatic frequency control system shown in FIGURE 1.

Reference numeral 10 generally designates a microwave receiver having an automatic frequency control system constructed according to the principles of this invention.

The illustrated receiver 10 comprises a mixer 11, preferably a crystal diode coupled to an antenna 12 and also coupled to an output coupling loop 13 of a klystron oscillator tube 14, to develop an intermediate frequency signal at a frequency equal to the difference between the input frequency and the frequency of operation of the klystron tube 14. The intermediate frequency signal may, for example, be 70 mc. and is applied to an IF amplifier 15 having an output connected to a discriminator circuit 16 which develops an output signal at a terminal 17. Terminal 17 may be connected to the input of a suitable video or audio amplifier.

The IF amplifier 15 may preferably comprise eight stagger tuned transistor amplifier stages with a center frequency of 70 mc. with limiter diodes employed in the third through the eighth stages to eliminate noise present in the form of amplitude modulation. Power input terminals to the IF amplifier 15 are connected to terminals 18 and 19 of a power supply 20. Terminals 18 and 19 may, for example, supply voltages of plus twenty volts and minus twenty volts relative to ground.

In accordance with this invention, an output signal from the IF amplifier 15, preferably from the seventh amplifier stage thereof, is applied through line 21 to an automatic frequency control circuit 22. The circuit 22 responds to differences between the frequency of the output from the IF amplifier 15 at a predetermined frequency (70 mc.) to control the DC voltage of a line 23 coupled through a filter circuit 24 to a repeller electrode 25 of the klystron tube 14, the voltage of the repeller electrode 25 having a controlling effect on the frequency of the local oscillations produced by the klystron tube 14 and applied to the mixer 11.

The klystron tube 14 further includes a shell 26 which is connected to ground, a heater 27 connected to terminals 29 and 30 of the power supply 20, and a cathode 31 connected to the terminal of heater 27 which is connected to the terminal 30. By way of example, the terminal 30 may supply a voltage of minus 300 volts relative to ground, so as to obtain the required acceleration of electrons from the cathode 31 into the oscillation structure of the klystron 14 operated at ground potential. The repeller electrode 25 may be operated at a voltage in the neighborhood of from minus 500 to minus 600 volts relative to ground.

To supply the required operating voltage for the repeller electrode 25, the line 23 is connected to a line 33 within the automatic frequency control circuit 22, line 33 being connected to the output of a complementary amplifier including transistors 35 and 36 of opposite conductive types, forming an important feature of the invention. In particular, line 33 is connected to the variable contact of a potentiometer 37 connected at its opposite ends to the emitters of the transistors 35 and 36, and it is also connected through resistors 39 and 40 to the base electrodes of the transistors 35 and 36. The collectors of the transistors 35 and 36 are connected through capacitors 41 and 42 to the base electrodes thereof and are also connected through resistors 43 and 44 to circuit points 45 and 46. Circuit point 45 is connected through a fixed resistor 47 and an adjustable resistor 48 to a terminal 49 of the power supply 20 while circuit point 46 is connected through a fixed resistor 50 to a terminal 51 of the power supply 20. The terminal 49 may supply voltage of minus 300 volts relative to ground while terminal 51 may supply voltage of minus 700 volts relative to ground.

With this arrangement, the potential of the lines 23 and 33 will be at a value intermediate the potentials of the power supply terminals 49 and 51, and by increasing the impedance of one of the transistors 35, 36 relative to the other, the potential of the lines 23, 33 may be shifted in the direction required to maintain the output of the IF amplifier 15 at a substantially fixed value.

To control conduction of the transistors 35 and 36, the base electrodes thereof are connected through resistors 53 and 54 to the circuit points 55 and 56 forming output terminals of a discriminator circuit. In particular, circuit points 55 and 56 are connected through capacitors 57 and 58 to the line 33 and through oppositely poled diodes 59 and 60 to circuit points 61 and 62 forming output terminals of resonant circuits which are tuned to frequencies below and above the desired IF frequency. For example, the resonant circuit connected to circuit point 61 may be tuned to approximately 64 mc. while the resonant circuit connected to circuit point 62 may be tuned to 76 mc.

The resonant circuits include variable capacitors 63 and 64 connected between circuit points 61 and 62 and ground, and inductors 65 and 66 connected between circuit points 61 and 62 and the line 33, line 33 being connected through a bypass capacitor 67 to ground. In addition, circuit points 61 and 62 are connected through coupling capacitors 69 and 70 to a circuit point 71 which is connected through a variable capacitor 72 and a fixed capacitor 73 to ground. Circuit point 71 is also connected to the collector of a transistor 74 and through a resistor 75 and an inductor 76 to a circuit point 77 connected through a resistor 78 to the power supply terminal 19. The emitter of transistor 74 is connected through a capacitor 79 to ground and also through a resistor 80 to a circuit point 81 connected to the power supply terminal 18, while the base of transistor 74 is connected to the line 21 and through an inductor 83 to ground.

In operation, the transistor 74 operates as a combined amplifier and limiter to develop at its collector a signal corresponding to that applied on the line 21 and of increased but substantially constant amplitude. The inductor 76 and capacitors 72 and 73 in effect form a parallel resonant circuit to increase the amplification. The signal so developed is applied to the resonant circuits formed by capacitors 69 and 70, inductors 65 and 66 and capacitors 63 and 64. Capacitor 63 is adjusted so that together with parallel inductor 65 an inductive reactance is presented which, with the series capacitance of capacitor 69, provides a circuit which is series resonant at a frequency lower than the desired IF output frequency. Similarly, capacitor 64 is so adjusted as to provide a circuit resonant at a frequency higher than the desired frequency. Thus capacitors 69 and 70 provide coupling from the limiter-amplifier stage including transistor 74 and also form parts of series-resonant circuits to provide a voltage stepup without necessitating a transformer.

When the frequency of the output signal of the IF amplifier is at the desired value, certain DC voltages will be developed across the capacitors 57 and 58 which will cause the transistors 35 and 36 to present certain collector-emitter impedances and to establish a certain potential at the line 33 connected through the line 23 and the filter 24 to the repeller electrode 25 of the klystron tube 14. If the frequency at the output of the IF amplifier increases, the DC voltage developed across capacitor 57 will decrease while the DC voltage developed across capacitor 58 will increase to cause the potentials of the base electrodes of both transistors 35 and 36 to move in a negative direction and to drive the transistor 35 toward cut off while driving the transistor 36 toward saturation. The potential of the line 33 will then move in a negative direction to move the potential of the repeller 25 in a negative direction and to produce a change in the frequency of the operation of the klystron tube 14 such as to bring the frequency at the output of the IF amplifier 15 back to the desired value.

Conversely, a decrease in the frequency of the signal from the IF amplifier 15 will cause the potential of the base electrodes of both transistors 35 and 36 to move in a positive direction to drive transistor 35 toward saturation and to drive transistor 36 toward cut off, to thereby produce a reverse effect.

It is important to note that a direct coupling, i.e., a substantially noncapacitive coupling having a relatively low DC resistance, is provided between the automatic frequency control circuit 22 and the repeller electrode 25 of the klystron tube 14 and coupling networks which introduce losses or drift are eliminated. Further, most of the automatic frequency control loop gain is in the AC portions of the circuit, rather than in the DC portions thereof, and the effects of DC amplifier drift are minimized.

As noted above, the capacitors 69 and 70 which couple the IF signal to the discriminator are parts of series resonant circuits to produce voltage stepups without requiring a transformer.

A further important feature of the circuit is that the outputs from the diodes 59 and 60 of the discriminator sections are summed in the complementary amplifier and losses due to resistive summing networks are eliminated. Further, the input impedance of the complementary amplifier is quite high, which reduces loading of the discriminator circuit.

It is also important to note that the effects of leakage occurrence in the complementary amplifier transistors 35 and 36 cancel so as to make the circuits stable with changes in temperature.

A still further feature of the circuit is in the provision of means for limiting the voltage applied to the complementary amplifier. In particular, an adjustable resistor 84 and a fixed resistor 85 are connected in series between the collectors of the transistors 35 and 36. In addition to protection of the transistors 35 and 36, such resistors serve to limit the range of automatic frequency control correction to the repeller electrode, which prevents the circuitry from detuning the klystron tube 14 to a point outside the bandpass of the IF amplifier 15 during deep fade conditions, momentary loss of primary power, or any other condition which might interrupt the incoming signal.

The illustrated circuit further incorporates metering means for checking the circuit operation. In particular, a microammeter 86 is connected to ganged movable switch contacts 87 and 88. In one position, contact 87 is engaged with a fixed contact connected through resistors 89 and 90 to the collectors of transistors 35 and 36, while contact 88 is connected through a resistor 91 to the line 23. In a second position, contact 87 is engaged with a fixed contact connected through resistors 93 and 94 to the circuit points 55 and 56, while contact 88 is engaged with a fixed contact connected directly through the line 23. Preferably, the relative tuning of the resonant circuits of the discriminator are adjusted to obtain a zero reading on the meter 86 in the second position of the contacts, and the potentiometer 37 is adjusted to obtain a zero reading of the meter 86 in the first position of the contacts, when the output frequency of the IF amplifier is at the desired value. Resistor 48 may then be adjusted to obtain a repeller electrode voltage at substantially midrange, while producing the required frequency output from the klystron tube 14.

It should be noted that the automatic frequency control circuit 22 may be disposed in a separate module, and to minimize application of undesired high frequency transient signals to the module, bypass capacitors may be connected to leads thereto. Thus bypass capacitors 97–103 may be respectively connected between ground and line 23, circuit point 45, circuit point 46, circuit point 77, circuit point 81, the junction between resistors 89 and 90, and the junction between resistors 93 and 94.

The filter circuit 24 preferably comprises a resistor 105 connected in series between line 23 and repeller electrode 25, a capacitor 106 and a diode 107 connected in parallel between the line to electrode 25 and the line connected to cathode 31, and a capacitor 108 connected between ground and the line to repeller electrode 25.

FIGURE 2 illustrates a modification of the output portion of the automatic frequency control circuit 22, wherein the resistors 84 and 85 are removed and replaced by a Zener diode voltage regulator 110, operative to limit the voltage across the transistors 35 and 36 and thereby protect the transistors and obtain advantages similar to those obtained with the resistors 84 and 85, as above discussed.

By way of illustrative example and not by way of limitation, the components have values according to the following table, wherein the values of resistors are in ohms, with "K" indicating thousands of ohms, "M" indicating megohms, wherein the values of capacitors are in microfarads, with "pf." indicating picofarads, and wherein the values of inductors are in henries, with "$\mu$h." indicating microhenries.

| Reference numeral | Component value |
|---|---|
| **37** | 500 |
| **39** | 2K |
| **40** | 2K |
| **41** | 1 |
| **42** | 1 |
| **43** | 1K |
| **44** | 1K |
| **47** | 6.8K |
| **48** | 25K |
| **50** | 40K |
| **53** | 10K |
| **54** | 10K |
| **57** | .001 |
| **58** | .001 |
| **63** pf. | 0.8–8 |
| **64** pf. | 0.8–8 |
| **65** $\mu$h. | 0.47 |
| **66** $\mu$h. | 0.56 |
| **67** | .001 |
| **69** pf. | 1 |
| **70** pf. | 1 |
| **72** pf. | 0.8–8 |
| **73** pf. | 4.7 |
| **75** | 1K |
| **76** $\mu$h. | 0.47 |
| **78** | 3.6K |
| **79** | .001 |
| **80** | 6.8K |
| **83** $\mu$h. | 8.2 |
| **84** | 5K |
| **85** | 1K |

| Reference numeral | | Component value |
|---|---|---|
| 89 | | 10K |
| 90 | | 10K |
| 91 | | 510K |
| 93 | | 47K |
| 94 | | 47K |
| 97 | pf | 470 |
| 98 | pf | 470 |
| 99 | pf | 470 |
| 100 | pf | 470 |
| 101 | pf | 470 |
| 102 | pf | 470 |
| 103 | pf | 470 |
| 105 | | 150K |
| 106 | | 0.47 |
| 108 | | 0.27 |

It will be understood that modifications and variations may be effected without departing from the spirit and scope of the normal concepts of this invention.

I claim as my invention:

1. In a system including a source supplying a high frequency signal having a certain DC reference level, and a device to be controlled having a control electrode operative in a DC range displaced substantially from said certain DC reference level, a discriminator circuit having input, DC amplifier means having an input directly said high frequency signal to said discriminator circuit input, DC amplifier means having an input directly coupled to said discriminator circuit output and having an output directly coupled to said control electrode, and power supply means having terminals connected to said DC amplifier means and operated at potentials displaced substantially from said certain DC reference level and on opposite sides of said DC range of operation of said control electrode.

2. In a system having a reference ground and including a transistor amplifier stage supplying a high frequency signal at a low DC potential level relatively close to that of said reference ground, and a device to be controlled have a control electrode operative in a high DC potential range, a discriminator circuit having an input and an output, capacitance means for applying said high frequency signal from said transistor amplifier stage to said discriminator circuit input, DC amplifier means having an input directly coupled to said discriminator circuit output and having an output directly coupled to said control electrode, and power supply means having terminals connected to said DC amplifier means and operated at high DC potentials above and below said high DC potential range, said capacitance means having a relatively low value to protect said transistor amplifier stage against voltage transients in said discriminator circuit.

3. In a system including a source supplying a high frequency signal having a certain DC reference level, and a device to be controlled having a control electrode operative in a DC range displaced substantially from said certain DC reference level, a discriminator circuit having an input and having a pair of output terminals, capacitance means for applying said high frequency signal to said discriminator circuit input, complementary DC amplifier means having a pair of input terminals respectively coupled directly to said pair of output terminals of said discriminator circuit and having an output connected directly to said control electrode, and power supply means having terminals connected to said DC amplifier means and operated at potentials displaced substantially from said certain DC reference level and on opposite sides of said DC range of operation of said control electrode, said discriminator circuit being operative in response to changes in the frequency of said high frequency signal to change the potentials of said output terminals and to control said complementary DC amplifier means to shift the potential of said control electrode.

4. In a microwave system including a source supplying a high frequency signal having a certain DC reference level and oscillator means controlling the frequency of said signal including a klystron having a repeller electrode operative in a DC range displaced substantially from said certain DC reference level, a discriminator circuit having an input and an output, capacitance means for applying said high frequency signal to said discriminator circuit input, DC amplifier means having an input directly coupled to said discriminator circuit output and having an output directly coupled to said repeller electrode, and power supply means having terminals connected to said DC amplifier means and operated at potentials displaced substantially from said certain DC reference level and on opposite sides of said DC range of operation of said repeller electrode.

5. In a receiver system including a mixer, means for applying an input signal to said mixer, local oscillator means coupled to said mixer and including a device having a control electrode, the voltage of said control electrode having a controlling effect on the frequency of said oscillator means, an IF amplifier having an input coupled to said mixer and having an output for supplying an output signal at a frequency equal to the difference between the frequency of said input signal and the frequency of operation of said oscillator means, said output signal having a certain DC reference level and said control electrode being operative in a DC range displaced substantially from said certain DC reference level, a discriminator circuit having an input and on output, capacitance means for applying said output signal to said discriminator circuit input, DC amplifier means having an input directly coupled to said discriminator circuit output and having an output directly coupled to said control electrode, and power supply means having terminals connected to said DC amplifier means and operated at potentials displaced substantially from said certain DC reference level and on opposite sides of said DC range of operation of said control electrode.

6. In a system including a source supplying a high frequency signal having a certain DC reference level, and a device to be controlled having a control electrode operative in a DC range displaced substantially from said certain DC reference level, a discriminator circuit having an input and having a pair of parallel output terminals, means for applying said high frequency signal to said discriminator circuit input, DC amplifier means including a pair of transistors of opposite types each having base, emitter and collector electrodes, means coupling said base electrodes to said parallel output terminals of said discriminator circuit, means coupling said emitter electrodes directly to said control electrode, power supply means having a pair of terminals operated at potentials displaced substantially from said certain DC reference level and on opposite sides of said DC range of operation of said control electrode, and means coupling said collector electrodes to said power supply terminals.

7. In a system including a source supplying a high frequency signal having a certain DC reference level, and a device to be controlled having a control electrode operative in a DC range displaced substantially from said certain DC reference level, a discriminator circuit comprising a pair of resonant circuits respectively tuned to frequencies substantially higher and lower than that of said high frequency signal, means for applying said high frequency signal to said resonant circuits, rectifier means for rectifying voltages developed by said resonant circuits, DC amplifier means having an input and an output, means for applying said rectified voltages from said rectifier means to said DC amplifier input, means for coupling said DC amplifier means output directly to said control electrode, and power supply means having terminals connected to said DC amplifier means and operated at potentials displaced substantially from said certain DC reference level and on opposite sides of said DC range of operation of said control electrode.

8. In a system including a source supplying a high frequency signal having a certain DC reference level, and a device to be controlled having a control electrode operative in a DC range displaced substantially from said certain DC reference level, a discriminator circuit comprising a pair of resonant circuits respectively tuned to frequencies substantially higher and lower than that of said high frequency signal, each of said resonant circuits comprising an inductor and a capacitor connected in series relation with said inductor, each of said capacitors being arranged to couple said high frequency signals to a separate one of said inductors, rectifier means for rectifying voltages developed by said resonant circuits, DC amplifier means having an input and an output, means for applying said rectified voltages from said rectifier means to said DC amplifier input, means for coupling said DC amplifier means output directly to said control electrode, and power supply means having terminals connected to said DC amplifier means and operated at potentials displaced substantially from said certain DC reference level and on opposite sides of said DC range of operation of said control electrode.

9. In a system as defined in claim 8, each of said resonant circuits including an additional capacitor connected in generally parallel relation with a separate one of said inductors.

10. In a microwave receiver system including a mixer, means for applying an input signal to said mixer, local oscillator means coupled to said mixer and including a klystron having a repeller electrode, an IF amplifier having an input coupled to said mixer and having an output for supplying an output signal having a DC level and a frequency equal to the difference between the frequency of said input signal and the frequency of operation of said oscillator means, said repeller electrode being operated in a DC range highly negative with respect to the DC level of said output signal, a discriminator circuit having an input and an output, capacitance means for applying said high frequency signal to said discriminator circuit input, DC amplifier means having an input directly coupled to said discriminator circuit output and having an output directly coupled to said control electrode, and power supply means having terminals connected to said DC amplifier means and operated at highly negative potentials on opposite sides of said DC range of operation of said repeller electrode.

11. In a receiver system including a mixer, means for applying an input signal to said mixer, local oscillator means coupled to said mixer and including a device hav ing a control electrode, the voltage of said control elec trode having a controlling effect on the frequency of sai oscillator means, an IF amplifier coupled to said mixe and arranged to develop an output signal at a frequenc equal to the difference between the frequency of sai input signal and the frequency of operation of said osci lating means, demodulator means responsive to said ou put signal, a discriminator circuit having an input an an output, a limiter-amplifier stage for applying said ou put signal to said discriminator circuit at a limited ampl tude level, and DC amplifying means having an inpu directly coupled to said discriminator circuit output an having an output directly coupled to said control electrode 12. In a system including a source supplying a hig frequency signal having a certain DC reference leve and a device to be controlled having a control electrod operative in a DC range displaced substantially from sai certain DC reference level, a discriminator circuit havin an input and an output, capacitance means for applyin said high frequency signal to said discriminator circu input, DC transistor amplifier means having an input d rectly coupled to said discriminator circuit output an having an output directly coupled to said control elec trode, power supply means having terminals connected t said DC amplifier means, and means for limiting th voltage applied from said power supply means to sai DC transistor amplifier means to protect said amplifie means against excess voltage.

13. In a system as defined in claim 12, said power sup ply means and said DC amplifier means each having fir terminals coupled together and second terminals couple together, said voltage limiting means comprising adjusta ble resistor means coupled to said first and second term nals in generally parallel relation with said power suppl means and said DC amplifier means.

14. In a system as defined in claim 12, said voltag limiting means comprising Zener diode regulating mean

References Cited

UNITED STATES PATENTS

| | | | |
|---|---|---|---|
| 2,749,384 | 5/1956 | Crane et al. | 331—6 X |
| 3,125,728 | 3/1964 | Fasulo | 331— |
| 3,307,115 | 2/1967 | Tschannen | 331— |

KATHLEEN H. CLAFFY, *Primary Examiner.*

R. LINN, *Assistant Examiner.*